(No Model)

F. McTAGGART.
CAR COUPLING.

No. 571,926.                   Patented Nov. 24, 1896.

WITNESSES:
Otis D. Swett.
H. A. Daniels.

INVENTOR
Francis McTaggart
BY Thomas P. Simpson
ATTORNEY.

UNITED STATES PATENT OFFICE.

FRANCIS McTAGGART, OF IROQUOIS, SOUTH DAKOTA.

CAR-COUPLING.

SPECIFICATION forming part of Letters Patent No. 571,926, dated November 24, 1896.

Application filed July 28, 1896. Serial No. 600,745. (No model.)

*To all whom it may concern:*

Be it known that I, FRANCIS MCTAGGART, a citizen of the United States, residing at Iroquois, in the county of Kingsbury and State of South Dakota, have invented certain new and useful Improvements in Car-Couplers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to double hook-and-catch car-couplings; and it consists in the improvement thereof, as hereinafter described.

Figure 1:
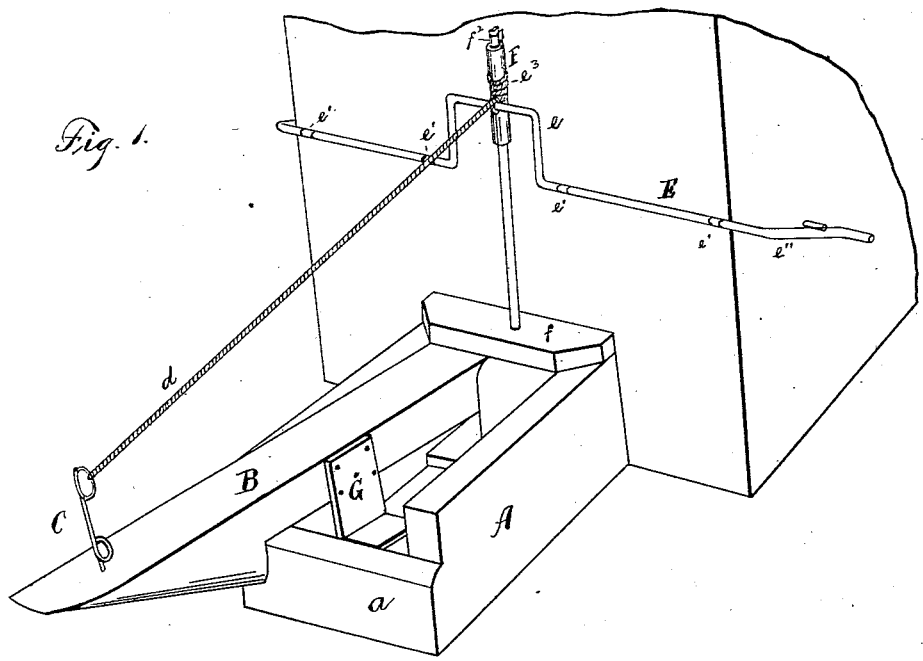
Figure 2:
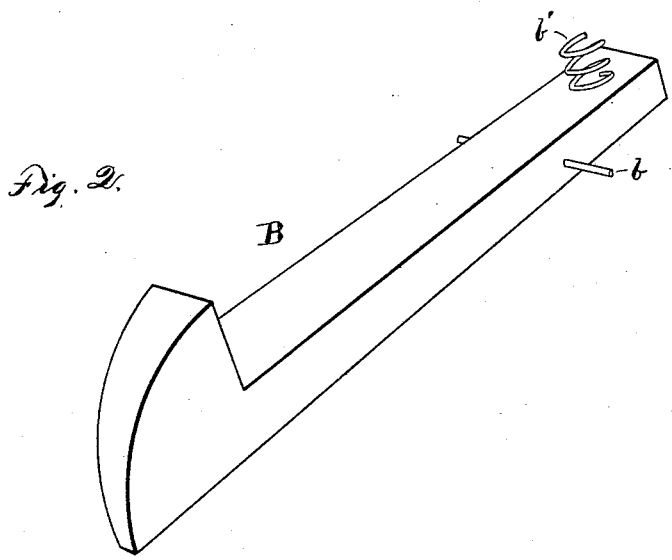

Figure 1 of the drawings is a perspective view showing a draw-bar provided with my catch and the front of a freight-car with my uncoupling device, and Fig. 2 is a detail perspective view of my coupler-hook.

In the drawings, A represents a draw-bar having the transverse catch $a$, which is engaged by the coupling-hook of another draw-bar when two cars are brought together. The catch $a$ is beveled on the outside of the upper edge, while the upper part of draw-bar is open to allow for the free movement of the coupling-hooks B, which are pivoted at $b$ and have under the rear end a spiral or other spring $b'$, that presses upward, so as to automatically couple the hooks as soon as they have passed over the catches $a$. The springs also keep the two draw-bars or draw-heads coupled until the hooks are lifted by manual force.

C is an upright on the upper part of the hook B, the same being made rigid or elastic, as may be preferred, and attached at the top by a flexible connection $d$ with the middle crank $e$ of a shaft E, which is arranged in bearings $e'$ on the front of a freight-car. At the outer ends of this shaft are the right-angled arms $e''$ $e''$, so arranged that the uncoupling may be done from either side of the car. With the front end of the crank $e$ is connected by a rope or chain $e^2$ the turn-post or vertical windlass F, which is stepped at bottom in a bearing $f$ and passed near the top through a guide $f^2$. Thus it will be seen that the uncoupling may be done from the top of car or from either side thereof.

On the side of coupling-hook B is secured the right-angled plate G, which comes under the hook of car with which it is to be coupled. This enables both hooks to be simultaneously uncoupled from either car.

The crank-arm, when pressed down to hold up the coupling-hook, is sprung over a pin on the side of the car and is released in the same way when it is desired that the hook shall be allowed to fall.

What I claim as new is—

1. In double-hook car-couplings, the right-angled plate G, attached to one side of the hook and adapted to come under the hook of opposite draw-head as and for the purpose specified.

2. A hook B having the superposed upright C combined with a shaft E having the crank $e$ flexibly connected with said upright and with a turn-post F as shown and described.

In testimony whereof I affix my signature in presence of two witnesses.

FRANCIS McTAGGART.

Witnesses:
O. J. KRUEGER,
L. A. McTAGGART.